United States Patent [19]

Goossens

[11] Patent Number: 4,721,864

[45] Date of Patent: Jan. 26, 1988

[54] INDUCTIVE PULSE GENERATOR

[75] Inventor: Andre Goossens, Rumst, Belgium

[73] Assignee: Alfred Teves GmbH & Co. OHG, Bergneustadt, Fed. Rep. of Germany

[21] Appl. No.: 938,501

[22] Filed: Dec. 5, 1986

[30] Foreign Application Priority Data

Dec. 5, 1985 [DE] Fed. Rep. of Germany ....... 3542962

[51] Int. Cl.$^4$ ............................................. H03K 3/00
[52] U.S. Cl. ................................. 307/106; 310/155; 324/174; 360/110; 360/111; 360/125; 307/105
[58] Field of Search ............... 307/106, 105; 310/160, 310/152, 155, 169, 170, 113, 112; 324/160, 173, 174, 179, 166, 162, 163, 164, 171; 360/110, 111, 119, 112, 113, 125, 122, 126, 123; 318/138, 254, 439

[56] References Cited

U.S. PATENT DOCUMENTS

| | | | |
|---|---|---|---|
| 2,801,293 | 7/1957 | Howell et al. ........................ | 360/125 |
| 3,057,967 | 10/1962 | Clark .................................... | 360/123 |
| 3,495,048 | 2/1970 | Gooch ................................... | 360/119 |
| 3,793,545 | 2/1974 | Leiber et al. ........................ | 324/174 |
| 3,875,545 | 4/1975 | Curtiss ................................. | 360/125 X |
| 3,937,994 | 2/1976 | Presley et al. ..................... | 310/155 X |
| 4,045,738 | 8/1977 | Buzzell ................................ | 324/174 |
| 4,117,523 | 9/1978 | Masuda et al. ...................... | 360/110 |
| 4,256,986 | 3/1981 | Anderson ............................ | 310/155 |
| 4,567,376 | 1/1986 | Zebisch .............................. | 310/155 X |

Primary Examiner—William M. Shoop, Jr.
Assistant Examiner—Shik Luen Paul Ip
Attorney, Agent, or Firm—James B. Raden; Robert P. Seitter

[57] ABSTRACT

An inductive pulse generator for converting a rotary movement into a frequency proportional therewith. The pulse generator includes a measuring wheel (1) provided with poles (3) of magnetic material evenly distributed over the circumference of the measuring wheel. The pulse generator further includes a stator (4) provided with a magnetic core (6) with plate-shaped pole shoes (10) in a coil carrier (8) out of which end portions (12) of the pole shoes (10) project. The end portions (12) face the measuring wheel (1). A coil (7) surrounds the magnet core (6), at which coil (7) a pulsating voltage can be picked off with a frequency proportional to the number of revolutions of the measuring wheel (1), outside the area of the pole shoe (10) end portions (12) facing the measuring wheel (1). The thickness of the pole shoes (10) is increased by additional magnetic material (11) so as to increase the pulsating voltage which can be picked off at the coil (7).

4 Claims, 2 Drawing Figures

4,721,864

INDUCTIVE PULSE GENERATOR

BACKGROUND OF THE INVENTION

This invention relates to an inductive pulse generator for converting a rotary movement into a frequency proportional therewith. The pulse generator includes a measuring wheel provided with poles of magnetic material evenly distributed over the circumference of the measuring wheel. The pulse generator further including a stator provided with a magnet core with plate-shaped pole shoes in a coil carrier out of which end portions of the pole shoes project. The end portions face the measuring wheel. A coil surrounds the magnet core, at which coil a pulsating voltage can be picked off with a frequency proportional to the number of revolutions of the measuring wheel.

In a known inductive pulse generator of this type (DE-OS=German Published Patent Application No. 34 00 870 and DE-OS=German Published Patent Application No. 33 27 400) the magnet core of the stator has two plate-shaped pole shoes the thickness of which in practice corresponds to approximately one-third of the pole pitch of the measuring wheel. The measuring wheel is provided in the form of a gear of soft iron, while a permanent magnet is arranged between the pole shoes of the stator magnet core. The pulsating voltage which can be picked off at the coil of the stator is relatively low in case of a gear with a small module (i.e., less than approximately 0.6 mm) and of a predetermined air gap between the stator magnet core and the measuring wheel.

It is an object of this invention to provide a pulse generator of the above kind and type which, with the gap width between the stator magnet core and the measuring wheel being the same, is able to generate a higher pulse voltage or which will permit the design of a larger gap width, the pulse voltage being the same.

SUMMARY OF THE INVENTION

According to this invention, this object is achieved in that, outside the area of the pole shoe end portions facing the measuring wheel, the thickness of the pole shoes is increased by additional magnetic material. The additional magnetic material preferably has the design of strips. In this way it is possible to arrange the magnetic material between the pole shoes of the stator magnet core and the coil carrier so as to change the shape of the pole shoes. The strips may merely rest at the respective adjoining pole shoe and in case the core part between the pole shoes has the design of a permanent magnet the strips will be held at the pole shoes by the magnetic force.

The gap width is selected to be somewhat larger while renouncing a higher pulse voltage so that it is possible to arrange a covering plate of non-magnetic material between the measuring wheel and the pole shoe ends facing the measuring wheel. The covering plate prevents a magnetic short circuit of the pole shoe ends by iron particles at the pole shoe ends as, due to the non-magnetic covering plate, any iron particles will stick to the pole shoe ends to a considerably weaker extent than they would in case of the pole shoe ends not being covered.

BRIEF DESCRIPTION OF THE DRAWING

The following is a more detailed description of this invention, reference being made to preferred embodiments shown in the drawing in which.

DETAILED DESCRIPTION

Figure 1:
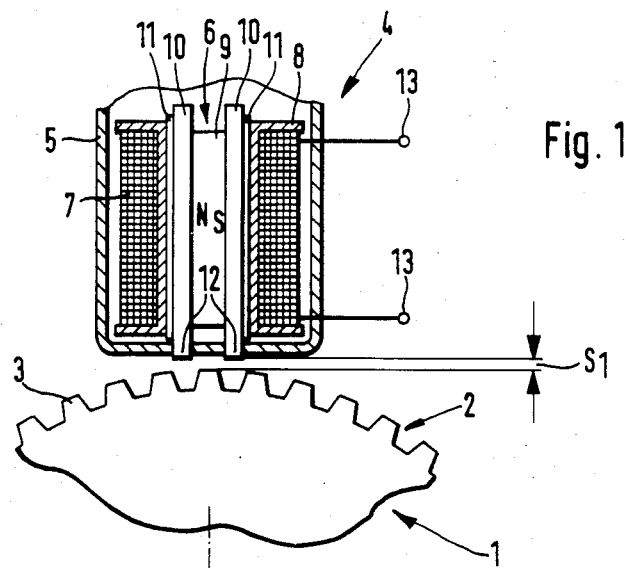
FIG. 1 is a first embodiment of the inductive generator in accordance with the present invention; and, FIG. 2 is a second embodiment of the present invention.

According to FIG. 1, a measuring wheel 1 is provided in the form of a soft iron gear is non-rotatably connected with a shaft rotatable about the center point M of the measuring wheel (1). The shaft rotates with a speed proportional to the number of revolutions of a wheel of an automotive vehicle the velocity of which is to be measured. The measuring wheel 1 has a gear rim 2 with teeth evenly distributed over the circumference of the measuring wheel 1 and corresponding to salient poles. The circumferential velocity or rather the number of revolutions of the measuring wheel 1 is registered by a sensor 4 serving as stator. The sensor 4 has a non-magnetic housing 5 wherein a magnet core 6 and a coil 7 are arranged in a coil carrier 8 surrounding the magnet core 6.

The magnet core 6 comprises a permanent magnet 9 and two plate-shaped pole shoes 10 of soft iron provided respectively on each of the ends of the permanent magnet 9, the pole shoes 10 each being reinforced by additional magnetic material having the design of a strip 11 of soft iron. The pole shoe 10 end portions 12 facing the measuring wheel are passed through the bottom of the housing 5 and have a distance $S_1$ to the outer circumference of the gear rim 2 in correspondence with a predetermined air gap width. The strips 11 may merely rest at the outsides of the pole shoes 10 and are held at the pole shoes 10 by means of the magnetic force of the permanent magnet 9.

The end portions 12 of the pole shoes 10 each have a thickness corresponding to approximately the module m of the teeth 3, the module being equal to the tooth pitch t divided by $\pi$ ($m = t/\pi$). This means that the thickness of the end portions 12 corresponds to approximately one-third of the tooth pitch t.

The measuring wheel 1 rotating, a pulsating voltage will be induced in the coil 7 of the sensor 4. The voltage can be picked off at terminals 13 of the coil 7 and will be fed to a non-illustrated slip monitoring electronic system or to a frequency measuring device. The pulse frequency of this voltage is equal to the repetition rate of the teeth 3 and thus proportional to the number of revolutions of the measuring 1. The additional strips 11 of magnetic material effect an increase in the voltage induced in the coil 7 as compared with a design of the magnet core 6 without the strips 11.

Figure 2:
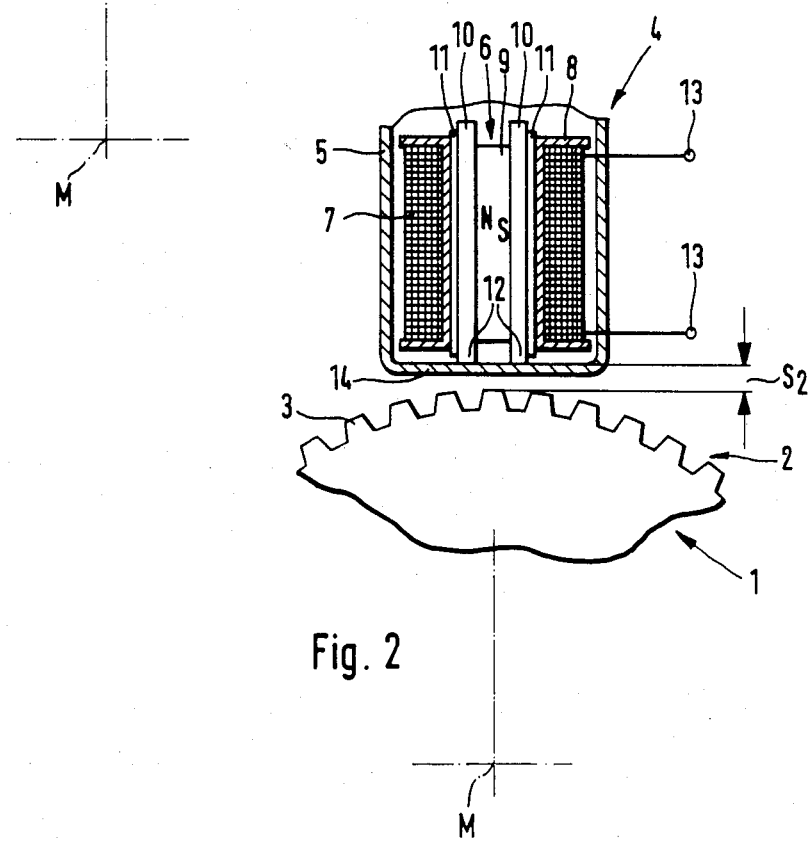

The embodiment according to FIG. 2 differs from that according to FIG. 1 only in that the bottom 14 of the housing 5 is solid and covers the pole shoe 10 ends facing the measuring wheel 1. This leads to a small increase in the distance $S_2$ of the pole shoes 10 to the measuring wheel 1 as compared with the distance $S_1$ in the example of an embodiment according to FIG. 1 and, thus, to a slight decrease in the pulsating voltage since a minimum air gap must be maintained between the measuring wheel 1 and the sensor 4 to form a play for the rotation of the measuring wheel. However, because of this covering of the pole shoe ends, the pole shoes will be prevented from becoming dirty by iron particles which might possibly cause a magnetic short circuit and, thus, a decrease in the pulse voltage.

A variation of the described embodiments can be provided such that in the example of an embodiment according to FIG. 1, an additional covering plate is provided at the bottom side of the bottom of the housing 5 between the sensor 4 and the measuring wheel 1, the distance $S_1$ being enlarged.

What is claimed is:

1. An inductive pulse generator for converting a rotary movement into a frequency proportional therewith, said pulse generator having a measuring wheel provided with poles of magnetic material evenly distributed over the circumference of said measuring wheel, and said pulse generator having a stator provided with a magnet core with plate-shaped pole shoes in a coil carrier out of which end portions of the pole shoes project, said end portions facing the measuring wheel, and with a coil surrounding the magnet core, at which coil a pulsating voltage can be picked off with a frequency proportional to the number of revolutions of the measuring wheel, wherein outside the area of the pole shoe (10) end portions (12) facing the measuring wheel (1), the thickness of the pole shoes (10) is increased by a predetermined amount of additional magnetic material.

2. A pulse generator as claimed in claim 1, wherein the additional magnetic material is provided in the form of strips (11).

3. A pulse generator as claimed in claim 2, wherein the strips (11) rest against the respective adjoining pole shoe (10).

4. A pulse generator as claimed in claim 3, wherein a covering plate (14) of non-magnetic material is arranged between the measuring wheel (1) and the pole shoe (10) ends facing the measuring wheel(1).

* * * * *